US012017249B2

(12) United States Patent
Iwamoto et al.

(10) Patent No.: US 12,017,249 B2
(45) Date of Patent: Jun. 25, 2024

(54) METHOD FOR FORMING COATING FILM ON CONSTANT VELOCITY UNIVERSAL JOINT

(71) Applicant: NTN CORPORATION, Osaka (JP)

(72) Inventors: Takafumi Iwamoto, Shizuoka (JP);
Kazuhiko Yoshida, Shizuoka (JP);
Masato Chokyu, Shizuoka (JP);
Shintaro Suzuki, Shizuoka (JP);
Hiromi Hayashi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/077,162

(22) Filed: Dec. 7, 2022

(65) Prior Publication Data
US 2023/0219115 A1 Jul. 13, 2023

Related U.S. Application Data

(63) Continuation of application No. 16/359,910, filed on Mar. 20, 2019, now abandoned, which is a continuation of application No. 14/420,368, filed as application No. PCT/JP2013/071592 on Aug. 9, 2013, now abandoned.

(30) Foreign Application Priority Data

Aug. 10, 2012 (JP) .................................. 2012-178011
Aug. 8, 2013 (JP) .................................. 2013-164831

(51) Int. Cl.
*B05D 3/02* (2006.01)
*B05D 1/04* (2006.01)
*B05D 1/06* (2006.01)
*B05D 7/14* (2006.01)
*C21D 1/42* (2006.01)
*F16D 3/20* (2006.01)
*C21D 1/18* (2006.01)
*C21D 9/00* (2006.01)

(52) U.S. Cl.
CPC .............. *B05D 3/0254* (2013.01); *B05D 1/04* (2013.01); *B05D 1/06* (2013.01); *B05D 3/0281* (2013.01); *B05D 7/14* (2013.01); *C21D 1/42* (2013.01); *F16D 3/20* (2013.01); *B05D 2401/32* (2013.01); *B05D 2601/20* (2013.01); *B60B 2310/208* (2013.01); *B60B 2310/54* (2013.01); *B60B 2310/616* (2013.01); *B60B 2900/141* (2013.01); *C21D 1/18* (2013.01); *C21D 9/0068* (2013.01); *C21D 2261/00* (2013.01); *Y10T 428/269* (2015.01); *Y10T 428/294* (2015.01); *Y10T 428/31529* (2015.04); *Y10T 428/31678* (2015.04)

(58) Field of Classification Search
CPC .......... B05D 3/0245; B05D 1/04; B05D 1/06; B05D 3/0281; B05D 7/14; B05D 2401/32; B05D 2601/20; C21D 1/42; C21D 1/18; C21D 9/0068; C21D 2261/00; F16D 3/20; F16D 3/223; F16D 2200/0086; F16D 2250/0023; F16D 2250/0046; F16D 2250/0053; B60B 2310/208; B60B 2310/54; B60B 2310/616; B60B 2900/141; B60B 35/14; B60B 27/0036; Y10T 428/269; Y10T 428/294; Y10T 428/31529; Y10T 428/31678

See application file for complete search history.

(56) References Cited

U.S. PATENT DOCUMENTS

| | | | | |
|---|---|---|---|---|
| 1,535,379 A * | 4/1925 | Rodman | ................... | C21D 1/58 148/29 |
| 2,485,310 A * | 10/1949 | Patremio | ................. | H04N 5/165 348/E5.07 |
| 5,908,664 A * | 6/1999 | Nagayama | ............ | C10M 171/00 427/369 |
| 7,018,716 B2 * | 3/2006 | Grubb | ................ | C08G 59/4253 428/416 |
| 7,930,954 B2 * | 4/2011 | Asakawa | ................ | B23P 15/24 409/132 |
| 8,070,885 B2 * | 12/2011 | Busatto | .................... | C21D 1/58 148/29 |
| 9,410,221 B2 * | 8/2016 | Suzuki | ..................... | C21D 9/40 |

FOREIGN PATENT DOCUMENTS

EP 0933440 A1 * 8/1999
WO WO-2012039255 A1 * 3/2012 ............... C21D 1/42

OTHER PUBLICATIONS

Britannica, the Editors of Encyclopaedia. "work hardening". Encyclopaedia Britannica, Feb. 4, 2020, https://www.brtiannica.com/technology/work-hardening. Accessed Jun. 2, 2022. (Year: 2020).*
CONDAT—"Reactive Soaps for Soaping." Retrieved from https://www.condatcorp.com/produit/lubricants-for-tubes/reactive-soaps-soaping-phosphated-steel-tubes/, last accessed Sep. 29, 2023. (Year: 2023).*

* cited by examiner

*Primary Examiner* — William P Fletcher, III
(74) *Attorney, Agent, or Firm* — Hedman & Costigan, P.C.; James V. Costigan; Kathleen A. Costigan (57) ABSTRACT

A coating film having excellent adhesion, even without the presence of a chemical conversion film treatment as an undercoat, and a metal automotive part having the coating film. A powder is deposited by powder-coating onto the surface of a metal automotive part that has been quenched after simultaneously forging, and tempering the metal automotive part and bake-hardening the deposited powder to form a skin film on the surface of the metal automotive part. The surface of the metal automotive part before the powder is powder-coated thereon is a work-hardened material surface that has not been subjected to a chemical conversion filming treatment.

10 Claims, 8 Drawing Sheets

METHOD FOR FORMING COATING FILM ON CONSTANT VELOCITY UNIVERSAL JOINT

This application is a continuation of application Ser. No. 16/359,910, filed Mar. 20, 2019, now abandoned, which is a continuation of application Ser. No. 14/420,368 filed Feb. 8, 2015, now abandoned, which claims the priority of PCT/JP2013/071592, filed Aug. 9, 2013 which claims the priority of JP 2012-178011, filed Aug. 10, 2010 and JP 2013-164831, filed Aug. 8, 2013.

TECHNICAL FIELD

The present invention relates to a metal automotive part, and specifically relates to a coating film that is formed on the surface of an outer joint member that constitutes a constant velocity universal joint and/or an intermediate shaft that constitutes a drive shaft.

BACKGROUND ART

Drive shafts that transmit power from an automotive engine to the drive wheels must respond to angular displacement and axial displacement arising due to changes in the relative positional relationship between the engine and wheels. Therefore, a configuration is typically provided in which a sliding-type constant velocity universal joint is provided on the engine-side (inboard side), and a fixed constant velocity universal joint is provided on the drive wheel-side (outboard side), with the two constant velocity universal joints linked by a metal intermediate shaft.

Both the sliding constant velocity universal joint and the fixed constant velocity universal joint that are installed on the drive shaft have a metal outer coupling member that is constituted by a cup that houses internal parts including an inner coupling member that is linked to the intermediate shaft and a stem part that extends integrally from this cup part in the axial direction.

The metal automotive parts comprising the outer coupling member of the constant velocity universal joint that is positioned on the inboard side, the outer coupling member of the constant velocity universal joint that is positioned on the outboard side, and the intermediate shaft that links the two constant velocity universal joints, are formed by forging, and thereafter surface-hardened by a heating treatment carried out by quenching in order to increase their strength or other attributes. After quenching, the parts are tempered in order to increase toughness, release some of the stress accompanying quenching, and prevent quench-cracking. In addition, a resin coating film is formed on the outer surfaces of these parts in order to improve corrosion resistance.

In order to form an anti-corrosion coat-film on an object such as an automobile, there are known in the art electrodeposition coating compositions which comprise (A) a cationic resin, (B) a low-temperature-dissociating block isocyanate hardener, and (C) a pigment paste having a pigment that is dispersed with a pigment-dispersing resin, where the pigment-dispersing resin has a hydrophobic resin SP value prior to cation formation of 10.0 to 11.0 and contains 1.6 to 4.0 primary amino groups per molecule, and where the A/B/C component ratios are 10 to 88/10 to 50/2 to 50. This electrodeposition coating composition provides stability during coating and corrosion resistance during rapid low-temperature baking (5 to 50 min) (patent document 1).

However, with electrodeposition, producing a thick coating film is a problem from the standpoint of the film-forming mechanism, and electrodeposited coating films alone produce insufficient corrosion resistance in some cases. In addition, a long period of time may be required for coating film formation, including the baking time.

With the objective of reducing costs and shortening treatment times for baking coating agents and for tempering metal automotive parts, there have been disclosed a method in which a metal automotive part are subjected to high-frequency quenching, and a powder coating is then applied to the outer surfaces of the automotive parts after quenching, whereupon tempering and baking of the automotive parts are carried out simultaneously by high-frequency induction heating; and a manufacturing apparatus associated with this method (patent document 2).

Other known methods used with metal automotive parts involve manufacturing the outer joint member that constitutes the constant velocity universal joint by cold-forging (patent document 3) finishing the track groove of the outer joint member, the cup-inlet chamfer, the track chamfer, and the track-inlet chamfer by cold-forging (patent document 4).

However, when a coating film is formed on the surfaces of the metal automotive parts, in order to improve adhesion of the coating film, even with the powder coating method descried above, a chemical conversion film treatment is carried out as an undercoat treatment. This treatment is a treatment in which the corrosion resistance, powder coating adhesion, and durability are increased by coating the basis material (surface to be coated) with, e.g., a manganese phosphate coating film, a zinc phosphate coating film, or an iron phosphate coating film. The chemical conversion film treatment increases manufacture costs because the treatment time is lengthened, and it is difficult to control the chemical conversion film thickness.

PRIOR ART DOCUMENTS

Patent Documents

Patent Document 1: Japanese Laid-Open Patent Application Publication No. Hei 7-173415
Patent Document 2: International Application No. WO2012/039255
Patent Document 3: Japanese Laid-Open Patent Application Publication No. 2002-346688
Patent Document 4: Japanese Laid-Open Patent Publication No. 2009-185932

SUMMARY OF THE INVENTION

Problems to be Solved by the Invention

The present invention was devised in order to resolve the aforementioned problems and pertains to a coating film for a metal automotive part which is formed by simultaneously carrying out tempering and powder coating bake-hardening of automotive parts that have been quenched. An object of the present invention is to provide a coating film that has superior adhesion without carrying out a chemical conversion filming treatment as an undercoat treatment, a metal automotive part that has this coating film, and a constant velocity universal joint.

Means for Solving the Problem

The coating film for a metal automotive part of the present invention is characterized in that a powder is deposited by powder-coating on the surface of a metal automotive part that has been quenched after forging, and tempering of the metal automotive part and bake-hardening of the deposited powder are performed simultaneously to form the coating film on the surface of the metal automotive part; the surface of the metal automotive part before the powder is deposited thereon being a work-hardened basis material surface that has not been subjected to a chemical conversion film treatment.

The invention also is characterized in that the basis material surface of the metal automotive part is a surface layer that has been quenched after forging, and a turned face in which a part of the surface layer has been turned. The invention also is characterized in that the basis material surface has been cleaned using an alkaline detergent.

The invention also is characterized in that the forging is cold forging, the surface hardness after cold forging is HRB 90 to 110, and the surface hardness after quenching is HRC 50 to 65.

The invention also is characterized in that the quenching is high-frequency quenching, and the simultaneous tempering and powder bake-hardening are carried out by high-frequency induction heating The invention also is characterized in that the powder that is deposited by powder coating to the surface of the metal automotive part is a pulverulent epoxy-based powder coating composition.

The invention also is characterized in that, in particular, the epoxy-based powder coating composition powder comprises a bisphenol A epoxy resin, a hydrazide compound, and an inorganic filler. The invention also is characterized in that the hydrazide compound is an organic acid polyhydrazide. The invention also is characterized in that the inorganic filler comprises barium sulfate.

The invention also is characterized in that the metal automotive part on which the coating film of the present invention is formed is an outer joint member that constitutes a constant velocity universal joint, or an intermediate shaft that constitutes a drive shaft.

The invention also is characterized in that the coating film on the outer joint member or the intermediate shaft has a thickness of 40 to 150 μm, a pencil hardness of H to 2H, and a corrosion resistance of 120 hr or greater according to salt water spray testing.

Effect of the Invention

The coating film for a metal automotive part of the present invention is formed by depositing a powder by a powder coating method involving the use of a specific powder coating composition powder (referred to below as "powder coating") and, after forging and subsequent quenching, tempering and bake-hardening of the powder that has been deposited are carried out simultaneously. Therefore, a coating film having superior corrosion resistance is obtained, even with a work-hardened basis material surface, without the pre-powder-deposition surface being subjected to a chemical conversion film-forming treatment. In addition, because tempering and bake-hardening of the powder are carried out simultaneously, the time for tempering the metal automotive part and the time for the coating treatment are shortened.

MODE FOR CARRYING OUT THE INVENTION

The metal automotive part is formed by a forging method using carbon steels for machine structural use and is manufactured by quenching and tempering. The outer surfaces of the part are also coated for rust-proofing. Work-hardening accompanying forging, thermal stress accompanying quenching, quench strain due to deformation stress, and other phenomena occur at the surface of the part. In addition, various iron oxides with different oxidation states are generated at the surface due to heating. For this reason, the outer surfaces of the parts, which are to be coated faces produced by, e.g., powder coating, have faces that are not chemically or physically uniform, and adhesion of the coating film to these faces is difficult to improve.

The outer joint member that constitutes the constant velocity universal joint, in particular, is constituted by a cup portion and a shaft portion, and the boundary part thereof often has thickened walls. In some cases, thermal strain arises due to differences in heating/cooling rates during coating film formation at the thickened wall part and the cup portion, and a decrease in adhesion of the coating film tends also to occur in such cases.

Therefore, in order to increase coating film adhesion, a chemical conversion coating is typically formed as an undercoat treatment prior to powder coating. However, it was discovered that the adhesion of the coating film is increased by alkali treatment alone, without formation of a chemical conversion film. The present invention is based on this knowledge.

Figure 1:
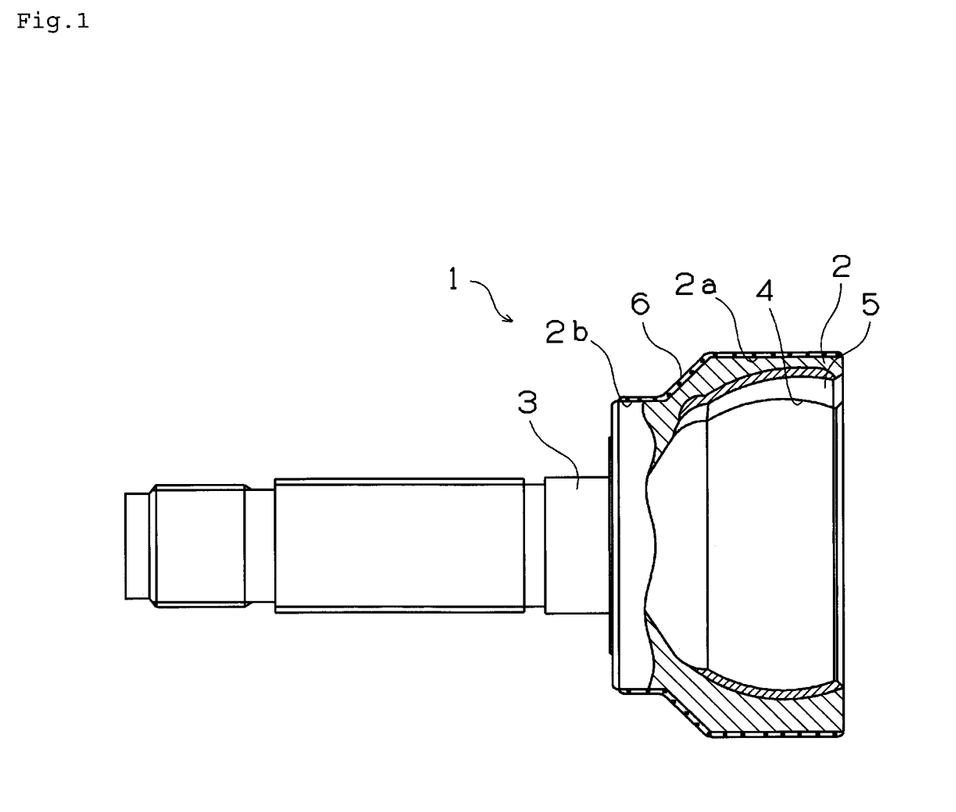
FIG. 1 is a partial cut-away axial sectional view of an outer joint member that constitutes a constant velocity universal joint.

An example of a metal automotive part is shown in FIG. 1. FIG. 1 is a partial cut-away axial sectional view of the outer joint member constituting a constant velocity universal joint.

An outer joint member 1 is constituted by a cup portion 2 and a shaft portion 3 that extends in an axial direction from a bottom part of this cup portion 2. The cup portion 2 has an inner circumferential face 4 formed in the shape of a sphere, and a track groove 5 that incorporates a track transfer ball (not shown) is formed in a plurality of locations in the circumferential direction of the inner circumferential face 4 extending in the axial direction. The track groove 5 has a sectional shape along the groove bottom that is an arc-shaped curved line. The surface of the inner circumferential face 4 is the quenched layer.

The outer joint member 1 is manufactured by a forging process involving a plurality of steps, including cold forging, hot forging, and warm forging, starting from cylindrical stock using carbon steel for machine structural use such as S40C, S43C, S45C, S48C, S50C, S53C, S55C, and S58C as stipulated in JISG4051. In particular, the final forging process is cold forging in order to increase the mechanical strength at the surface. The temperature during cold forging is preferably from 0° C. to 50° C.

During cold forging, the work-hardened surface 2a of the outer joint member 1 that has been plastically deformed as a result of compression stress is dramatically higher in terms of tensile strength, yield point, elastic limit, hardness, etc., but dramatically lower in terms of elongation, contraction, etc.

In the present invention, the surface hardness of the outer surface 2a after cold forging is preferably HRB 90 to 110. If the surface hardness is less than HRB 90, the hardness of the basis material will be insufficient, and when coating is carried out on the outer surface 2a, the influence of the hardness of the basis material will be felt, and the coating film hardness will decrease. It is undesirable for the surface hardness to exceed 110, because the machinability will decrease.

In addition, the surface hardness after quenching is preferably HRC 50 to 65. If the surface hardness is less than HRC 50, the abrasion resistance will be insufficient, and the rotational life will decrease. If the surface hardness exceeds 65, then early failure, cracking, etc. may occur.

The surface hardness after cold forging and after quenching is different depending on the portions of the outer surface 2a that have different degrees of working, and therefore the surface state will not be uniform.

In addition, there are cases in which the surface of the cup portion 2 at the end towards the shaft portion 3 is turned after cold forging.

The turned face may have different metal material structure depending on the turned portion and the depth from the surface at which the material is turned. Lubricating oil used during turning will also remain at the surface in some cases.

For quenching, it is possible to use a device having a heating part for heating the surface of the metal automotive part to a high temperature at which an austenite structural state is reached, and a cooling part for subsequently rapid-cooling the component to achieve conversion to a martensitic structure. The quenching method can be any one whereby the heating and cooling described above can be carried out.

An example of the heating part is a high-frequency quenching device employing a power source with a frequency of 1 KHz or greater, and an example of the cooling part is a water spray cooling device.

After quenching, a coating film 6 is formed on the outer surface 2a of the outer joint member 1 in order to increase the corrosion resistance. The coating film is formed by powder coating, with tempering and baking carried out simultaneously. Tempering and baking can be carried out using the method and the coil passage-type or multistage-type high-frequency induction heating device described, for example, in patent document 2.

The outer surface 2a on which the coating film 6 is formed is a work-hardened face or a coated face on which both a work-hardened face and turned face 2b are present together.

The coated face is not subjected to a chemical conversion treatment such as a zinc phosphate or iron phosphate treatment and a degreasing treatment that are typically carried out as pretreatments for improving adhesion.

A cleaning treatment with an alkaline detergent is carried out as a pretreatment.

The alkaline detergent may be any detergent that is composed of an alkaline aqueous solution that can remove non-reactive soap layers or reactive soap layers remaining on the outer surface 2a in the cold forging and quenching step.

A preferred detergent is one that has an aqueous solution containing, e.g., less than 5 mass % of sodium hydroxide as the primary component. A preferred alkaline detergent is one that also contains a surfactant that can effect, e.g., surface degreasing, rust-proofing, and stripping of the metal automotive part.

Commercially-available alkaline detergents include ACRODINE detergents (Kiwa Chemical), LIOMIC detergents (Lion Corp.), WA detergents (Kaken Tech), and LIGHT-CLEAN (Kyoeisha Chemical).

Cleaning using the alkaline detergent can be carried out at a temperature of 50 to 80° C. using immersion cleaning, spray cleaning, or ultrasonic cleaning.

The coating film 6 is formed by powder coating. The powder that is used in powder coating is preferably an epoxy resin system, polyester resin system, or acrylic resin system powder coating, or a composite system powder coating which is a mixture thereof. The powder coating method can involve producing a coating film thickness of 50 μm or greater in a single coating pass, and the coating performance such as corrosion resistance can be improved.

Among the powders described above, epoxy-system powder coatings are preferred due to their excellent corrosion resistance, acid resistance, alkali resistance, moisture resistance, and surface hardness subsequent to coating film formation.

The epoxy-system powder coating that can be used in the present invention is a powder coating comprising bisphenol A epoxy resin as the epoxy resin, hydrazide compound as hardener, and an inorganic filler.

The bisphenol A epoxy resin is an epoxy resin that is obtained by a single-stage, or two-stage reaction method from bisphenol A and epichlorohydrin. The bisphenol A epoxy resin has heat-curing properties whereby bake-hardening can be carried out simultaneously with respect to tempering of the metal automotive part, and the material has excellent properties such as coating film adhesion and corrosion resistance. Epoxy resins or the like such as cyclic epoxy resins, novolak epoxy resins, and acrylic epoxy resins may be used in conjunction with the bisphenol A epoxy resin.

Examples of commercially-available bisphenol A epoxy resins include Epo Tohto® YD-011 (epoxy equivalents 450 to 500 g/eq, softening point 60 to 70° C., Nippon Steel Chemical, Ltd.), Epo Tohto YD-012 (epoxy equivalents 600 to 700 g/eq, softening point 75 to 85° C., Nippon Steel Chemical), Epo Tohto YD-013 (epoxy equivalents 800 to 900 g/eq, softening point 85 to 98° C., Nippon Steel Chemical), Epo Tohto YD-014 (epoxy equivalents 900 to 1000 g/eq, softening point 91 to 102° C., Nippon Steel Chemical), Epo Tohto YD-017 (epoxy equivalents 1750 to 2100 g/eq, softening point 117-127° C., Nippon Steel Chemical), Epo Tohto YD-019 (epoxy equivalents 2400 to 3300 g/eq, softening point 130 to 145° C., Nippon Steel Chemical), Epo Tohto YD-902 (epoxy equivalents 600 to 700 g/eq, softening point 82 to 92° C., Nippon Steel Chemical), Epo Tohto YD-904 (epoxy equivalents 900 to 1000 g/eq, softening point 96 to 107° C., Nippon Steel Chemical), jER® Epoxy Resin 1001 (epoxy equivalents 450 to 500 g/eq, softening point 64° C., Mitsubishi Chemical, jER Epoxy Resin 1002 (epoxy equivalents 600 to 700 g/eq, softening point 78° C., Mitsubishi Chemical), jER Epoxy Resin 1003 (epoxy equivalents 670 to 770 g/eq, softening point 89° C., Mitsubishi Chemical), jER Epoxy Resin 1004F (epoxy equivalents 875 to 975 g/eq, softening point 97° C., Mitsubishi Chemical), jER Epoxy Resin 1005F (epoxy equivalents 950 to 1050 g/eq, softening point 107° C., Mitsubishi Chemical), Araldite® XAC5007 (epoxy equivalents 600 to 700 g/eq, softening point about 90° C., Ciba-Geigy Japan), Araldite GT7004 (epoxy equivalents 730 to 830 g/eq, softening point about 100° C., Ciba-Geigy Japan), Araldite GT7097 (epoxy equivalents 1650 to 2000 g/eq, softening point about 120° C., Ciba-Geigy Japan), DER-664® (epoxy equivalents 950 g/eq, Dow Chemical), and DER-667 (Dow Chemical). These products may be used individually, or two or more types may be used in conjunction.

It is preferable to use a hydrazide compound as the hardener for the bisphenol A epoxy resin. Organic acid polyhydrazides are preferred among these hydrazide compounds. Any organic acid polyhydrazide may be used, provided that it has two or more hydrazide groups (—CO—NH—NH$_2$) per molecule. Examples include $C_2$ to $C_{40}$ aliphatic carboxylic acid dihydrazides such as oxalic acid dihydrazide, malonic acid dihydrazide, succinic acid dihydrazide, glutaric acid dihydrazide, adipic acid dihydrazide, sebacic acid dihydrazide, and eicosanic diacid dihydrazide; aromatic polyhydrazides such as phthalic dihydrazide, terephthalic dihydrazide, isophthalic dihydrazide, pyromellitic dihydrazide, pyromellitic trihydrazide, and pyromellitic tetrahydrazide; monoolefinic unsaturated dihydrazides such as maleic dihydrazide, fumaric dihydrazide, and itaconic dihydrazide; and polyacrylic polyhydrazide.

Among them, aliphatic carboxylic dihydrazides are preferred, and adipic acid dihydrazide is particularly preferred due to its excellent coating film adhesion under conditions at which tempering and baking are carried out simultaneously.

The hydrazide compound is blended in a ratio of 1 to 50 parts by mass with 100 parts by mass of epoxy resin.

A hardening accelerator can be used in the epoxy-based powder coating along with the hardeners described above. Examples of hardening accelerators include imidazole compounds. There are no particular restrictions on the imidazole compound, and a compound having imidazole groups may be used, e.g., Curazole® (Shikoku Kasei).

It is preferable to use an inorganic filler for the epoxy-system powder coating. Examples of inorganic fillers include barium sulfate, talc, silica, calcium carbonate, feldspar, wollastonite, alumina, titanium dioxide, iron oxide, and carbon black.

Among them, barium sulfate and carbon black are essential components.

The inorganic filler is blended in an amount of 10 to 150 parts by mass with 100 parts by mass of epoxy resin.

The epoxy-system powder coating can be manufactured using a method that is well-known in the field of powder coatings. For example, this coating can be manufactured by, e.g., a method involving mixing raw materials such as a bisphenol A epoxy resin, hydrazide compound, hardening accelerator, barium sulfate, and carbon black with a Henschel mixer, etc., followed by melt-kneading using a device that is well-known to persons skilled in the art, such as an extruder or hot roller, followed by cooling, and then milling and sizing. Melt-kneading is preferably carried out under conditions that are at or below a temperature at which the hardening reaction will not progress The method for depositing the powder on the surface of the metal automotive part by powder coating may be any method that is well-known to persons skilled in the art, such as spray coating, electrostatic powder coating, electric field fluidization electrostatic coating, and fluidized coating. Electrostatic powder coating is preferred in consideration of the surface shape of the metal automotive part. Electrostatic powder coating can be carried out using a gun system in which charged powder coating is sprayed with a sprayer, or an electrostatic atomization system in which repulsion in the charged coating itself is utilized.

An outer joint member constituting a constant velocity universal joint is particularly preferably electrostatically powder coated using a method in which coating is charged with a spray gun, and the electrostatic force is used to coating epoxy-based powder onto the surface of an outer joint member that has been grounded.

Metal automotive parts having a powder coating applied to the outer surfaces are subjected to simultaneous coating film bake-hardening under the conditions at which the automotive part is tempered. Tempering is carried out by high-frequency induction heating. High-frequency induction heating can be carried out using, e.g., the method and device described in patent document 2.

The high-frequency induction heating device is constituted by a transport pathway such as a conveyor for conveying the outer joint member having powder deposited to the outer surface by a powder coating method subsequent to high-frequency quenching, and a high-frequency induction coil that is disposed along the direction of part transport of the transport pathway and whereby tempering and bake-hardening of the outer joint member are carried out simultaneously.

Figure 2:
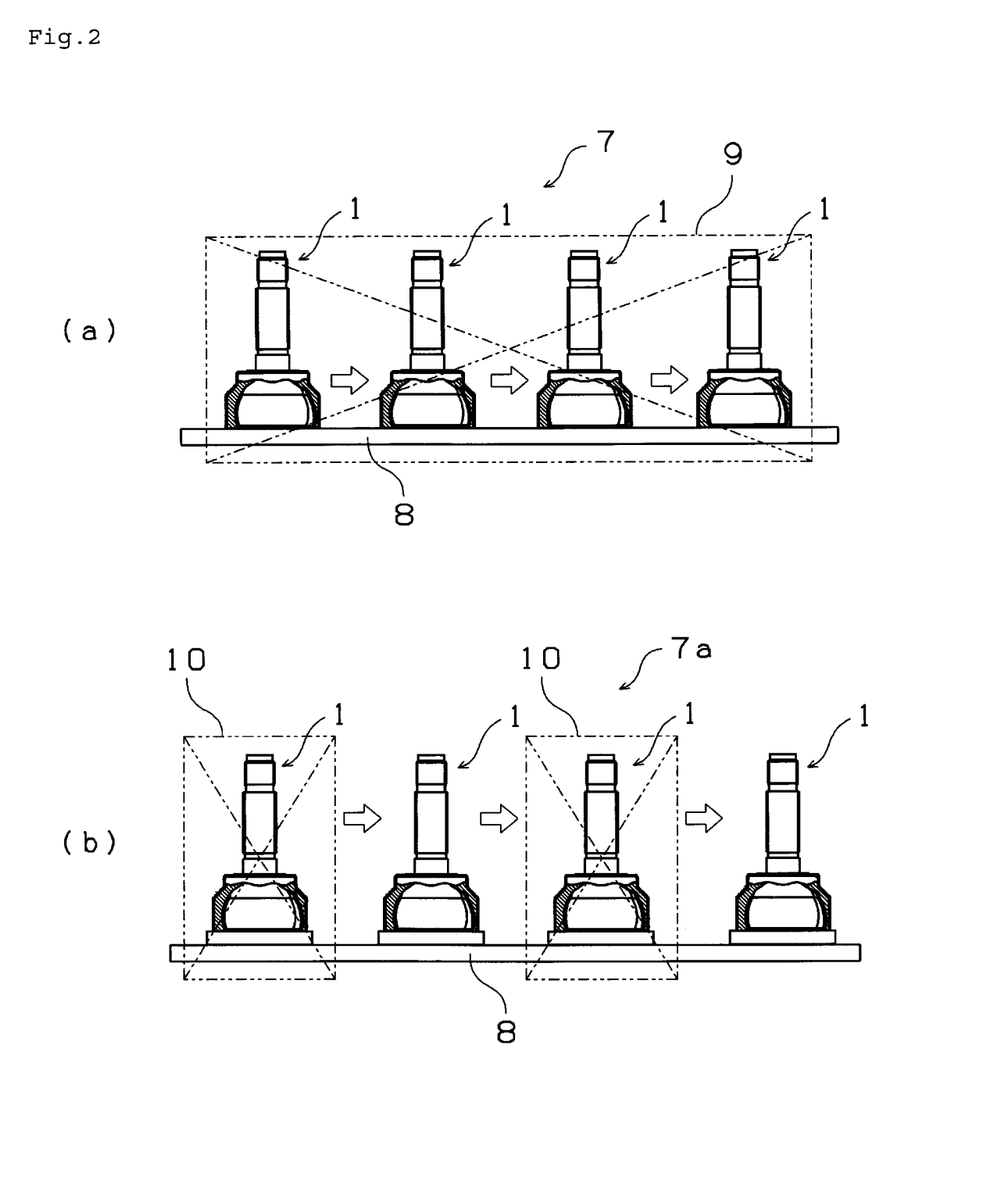
FIG. 2 shows a schematic view of a high-frequency induction heating device.

A schematic view of the high-frequency induction heating device is shown in FIG. 2. FIG. 2(a) shows the schematic configuration of the coil passage-type high-frequency induction heating device, and FIG. 2(b) is a diagram of the schematic configuration of the multistage-type high-frequency induction heating device.

The coil passage-type high-frequency induction heating device 7 shown in FIG. 2(a) is a device for continuously heating an outer joint member 1 moving over a transport pathway 8 with a high-frequency induction coil 9.

The multistage-type high-frequency induction heating device 7a shown in FIG. 2(b) is a device for intermittently heating the outer joint member 1 that is moving on a conveyor pathway 8 with a high-frequency induction coil 10.

A powder coating device (not shown) for powder coating powder onto the outer surface of the outer joint member 1 after high-frequency quenching is disposed at a pre-stage of the coil passage-type or multistage-type high-frequency induction heating device. In addition, a water-cooling and air-blowing device (not shown) for cooling the outer joint member 1 is disposed at a downstream stage of the high-frequency induction heating device.

A specific example of the coil passage-type high-frequency induction heating device is shown in FIGS. 3(a) and (b). FIGS. 3(a) and (b) are sectional views in the direction perpendicular to the transport direction of the outer joint member 1.

In the high-frequency induction heating device shown in FIG. 3(a), there is provided a high-frequency induction coil 9a disposed so that a part extends in a straight line along the part conveying direction on both sides of the transport pathway 8. The straight parts of the high-frequency induction coil 9 of the high-frequency induction heating device heat the outer joint member 1 on the transport pathway 8 from both sides. The coil in the straight parts that are disposed on one side of the transport pathway 8 and the coil in the straight parts that are disposed on the other side, although not shown in the drawings, form a high-frequency induction coil by being electrically connected so as to not impede entry and exit of the outer joint member 1 at the entrance side and exit side of the transport pathway 8.

The high-frequency induction heating device shown in FIG. 3(b) has a high-frequency induction coil 9b that is wound in a spiral along the part conveying direction of the transport pathway 8 so as to enclose the outer joint member 1 on the transport pathway 8. The high-frequency induction coil 9b of this high-frequency induction heating device is disposed so that the entire body extends along the part conveying direction of the transport pathway 8. This high-frequency induction coil 9b heats the outer joint member 1 on the transport pathway 8 from the entire circumference.

Figure 3:
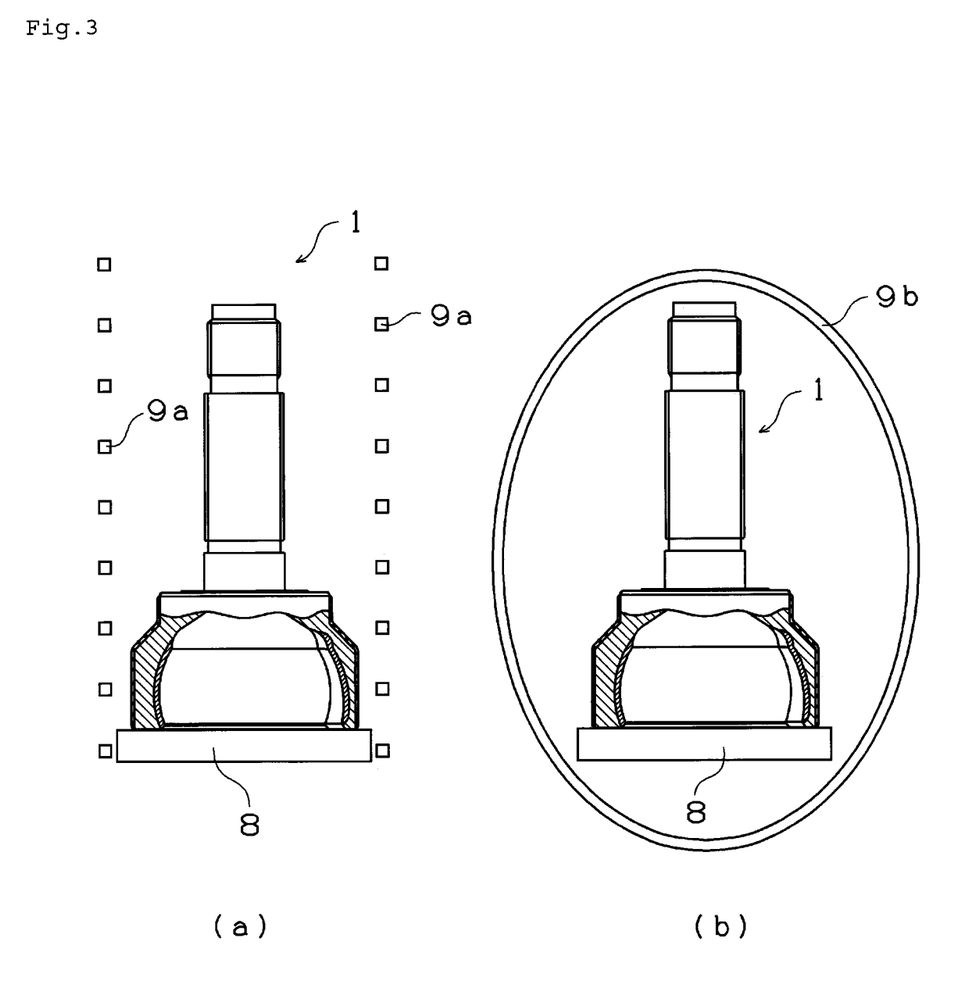
FIG. 3 shows a diagram of a specific example of a coil passage-type high-frequency induction heating device.

The high-frequency induction coil can be a combination of the device shown in FIG. 3(*a*) and the device shown in FIG. 3(*b*).

Figure 4:
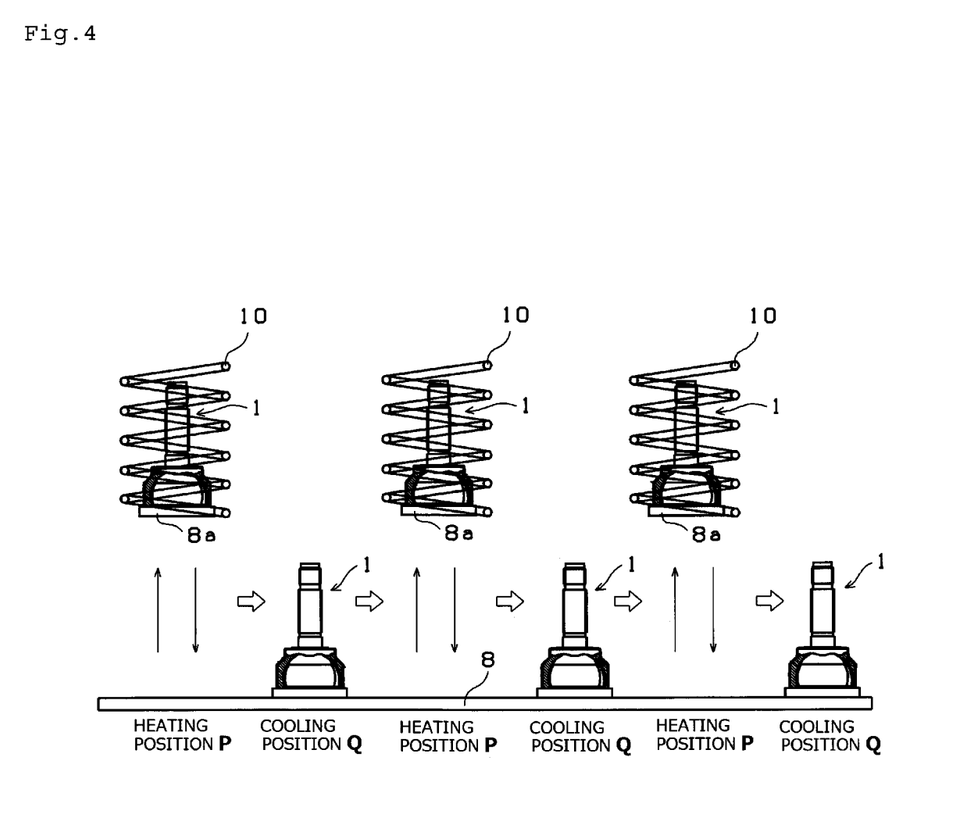
FIG. 4 shows a diagram showing a specific example of a multi-stage high-frequency induction heating device.

A specific example of the multi-stage high-frequency induction heating device is shown in FIG. 4. FIG. 4 is a configuration diagram showing a specific example of the multistage-type high-frequency induction heating device shown in FIG. 2(*b*).

Figure 5:
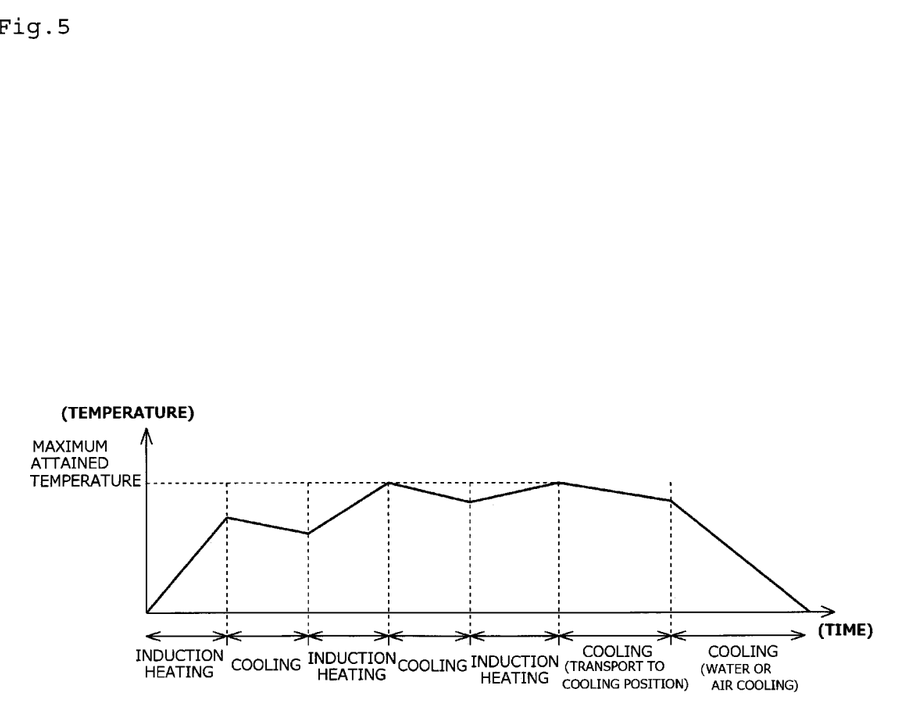
FIG. 5 shows a temperature chart for a multi-stage high-frequency induction heating device.

The high-frequency induction heating device having the format shown in FIG. 4 has a structure in which heating positions P at which the outer joint member 1 is heated by the high-frequency induction coil 10 and cooling positions Q at which the outer joint member 1 is allowed to cool are repeatingly disposed in an alternating manner along the part conveying direction of the transport pathway 8 that conveys the outer joint member 1. With this device, the high-frequency induction coils 10 that are wound as spirals are disposed above the transport pathway 8 in heating position P. An elevation mechanism (not shown) for vertically moving a stand 8a on which the outer joint member 1 is carried is present at this heating position P, and the outer joint member 1 is housed inside the high-frequency induction coil 10 by elevating the outer joint member 1 with this mechanism. The outer joint member 1 that moves over the transport pathway 8 is elevated at the heating position P, housed inside the high-frequency induction coil 10, and heated under predetermined conditions described below. The member is then allowed to cool on the transport pathway 8 in the cooling position Q. As shown in FIG. 5, heating and cooling are repeated, and tempering of the outer joint member and bake-hardening of the powder coating are carried out simultaneously.

Any high-frequency power source can be used for the high-frequency induction heating device, provided that it supplies high-frequency current to the heating coil. Examples include an electric generator oscillator, an electron tube oscillator, a thyristor inverter oscillator, and a transistor inverter oscillator. A current transformer (output transformer) may also be provided in order to supply high current at low-voltage to the heating coil side.

There are no particular restrictions on the frequency of the high-frequency current, but the current is typically of a frequency of 1 kHz or above. If the frequency is increased, only the vicinity of the surface of the part will be heated due to an eddy current surface skin effect, whereas if the frequency is decreased, heating will extend into the interior.

The outer joint member onto which powder has been deposited at the outer surface by powder coating using the high-frequency induction heating device described above is heated from room temperature to the maximum attained temperature of 200 to 240° C. over a period of about 3 to 5 min. Tempering of the outer joint member 1 and bake-hardening of the powder coating are then carried out simultaneously under these heating conditions. Subsequently, the outer joint member 1 is transported to the cooling position and is cooled while being transported, then cooled with a water-cooling and an air-blowing device for a period of about 1 to 3 min.

Figure 6:
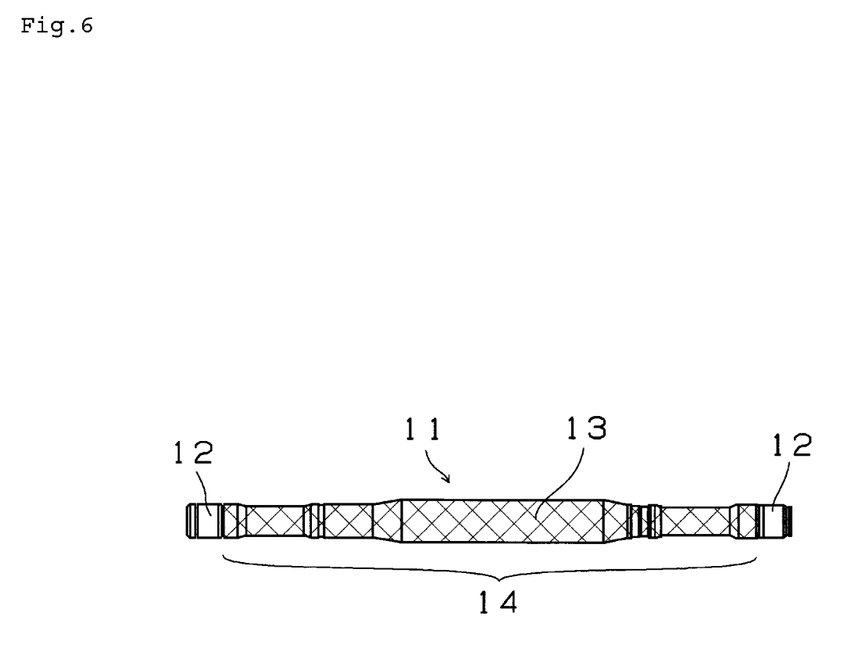
FIG. 6 shows an example of an intermediate shaft.

An example of the metal automotive part on whose surface a coating film has been powder coated is an outer joint member that constitutes a constant velocity universal joint, or an intermediate shaft that constitutes a drive shaft. An example of an intermediate shaft that links a pair of constant velocity universal joints and constitutes a drive shaft is shown in FIG. 6.

With the intermediate shaft 11, the two shaft end parts 12 are linked to the inner joint member of the constant velocity universal joint, and therefore a coating film is formed on the outer circumferential face (cross-hatched part 14) of the shaft center part 13, excluding at least the two shaft end parts 12. The metal automotive part of the present invention can be utilized in a hub constituting a wheel bearing device, and, in such a case, the region in which the coating film is formed is the hub pilot part.

The coating film that is formed on the surface of the intermediate shaft or the outer joint member preferably has a thickness of 40 to 150 µm. Corrosion resistance will be inferior if the thickness is less than 40 µm, whereas the powder coating will not sufficiently adhere to the face to be coated if the thickness exceeds 150 µm, the bake-hardening time will increase, and running will tend to occur in the coating film after bake-hardening.

The coating film preferably has a coating film hardness of H to 2H in terms of pencil hardness, and the corrosion resistance as determined by a salt water spray test is preferably 120 hr or greater. If the pencil hardness is less than H, then the coating may separate by external contact (stepping stones, etc.), whereas flexibility will decrease if the hardness exceeds 2H.

Regarding corrosion resistance as determined by the salt water spray test, the corrosion resistance is improved to 120 hr or greater over conventional coating films such as water-soluble baked coatings, because a thick coating film can be formed.

The constant velocity universal joint of the present invention has an outer joint member with a powder coated surface coating film as described above, an inner joint member, a drive shaft that is linked to the inner joint member, and boots that are installed on the outer joint member and drive shaft, directly or with another member interposed. The coating film is formed on the intermediate shaft surface of the drive shaft.

The following examples are presented in regard to the structure of the constant velocity universal joint. The outer joint member and drive shaft described above can be utilized in all of the structures.

By forming the coating film of the present invention, the treatment time required for coating film formation is decreased, the characteristics of the resulting coating film are exceptional, and a constant velocity universal joint with excellent durability can be manufactured with excellent productivity.

(A) A structure which has an outer universal joint on which three straight track grooves are formed in the inner circumferential face, extending in the axial direction, a tripod member serving as the inner joint member having three trunnion shafts that are provided so as to protrude in the radial direction, and rollers serving as rotating bodies that are rotatably supported on the trunnion shafts of the tripod member, with the rollers disposed so as to rotate freely along the track grooves of the outer joint member.

(B) A structure which has an outer joint member in which a plurality of straight track grooves are formed in the cylindrical inner circumferential face extending in the axial direction, an inner joint member in which a plurality of straight track grooves forming pairs with the track grooves of the outer joint member are formed in the spherical outer circumferential face, balls (3 to 8) provided as rotating bodies that are disposed between the track grooves of the outer joint member and the track grooves of the inner joint member, and a cage that retains the balls that are provided between the outer joint member and inner joint member.

(C) A structure which has an outer joint member in which a plurality of straight track grooves are formed in the inner circumferential face, an inner joint member having a structure in which a plurality of straight track grooves that form pairs with the track grooves of the outer joint member are formed in the outer circumferential face, with these track grooves and the track grooves of the outer joint member being inclined with respect to each other at a predetermined angle in the reverse direction with respect to the axis, balls (4, 6, 8, 10) that are interposed at the intersections of the outer joint member track grooves and inner joint member track grooves, and a cage that retains the balls between the outer joint member and inner joint member.

The constant velocity universal joint having the coating film of the present invention can have any configuration and is not limited to sliding constant velocity universal joints provided with a mechanism that slides in the axial direction of the outer joint member such as the tripod-type, double offset-type, or crossed-groove type described above. The joint therefore can be used as a fixed constant velocity universal joint of the type that employs balls, such as a Zeppa type (Birfield type). The tripod-type constant velocity universal joint also may be a double roller-type or single roller-type.

EXAMPLES

Example 1

The outer joint member shown in FIG. 1 was cold forged from cylindrical stock using carbon steel for machine structural use (S53C). The axial length of the cup portion was 88.4 mm, the outer profile was 84.8 mm, the shaft portion length was 81.9 mm, and the diameter was 34.9 mm. The surface hardness of the outer surface 2c after cold forging was HRB 99.

After cold forging, the surface portion was subjected to high-frequency quenching. After quenching and before tempering, cleaning was carried out by immersion in alkaline detergent (ACRODINE, Kiwa Chemical Industry) having a pH of 12 and a surfactant as the primary component, whereupon the material was rinsed with water and dried.

Epoxy-based powder coating (POWDAX® E70, Nippon Paint) was applied onto the surface of the cup portion using a corona discharge-type electrostatic powder coater.

Figure 7:
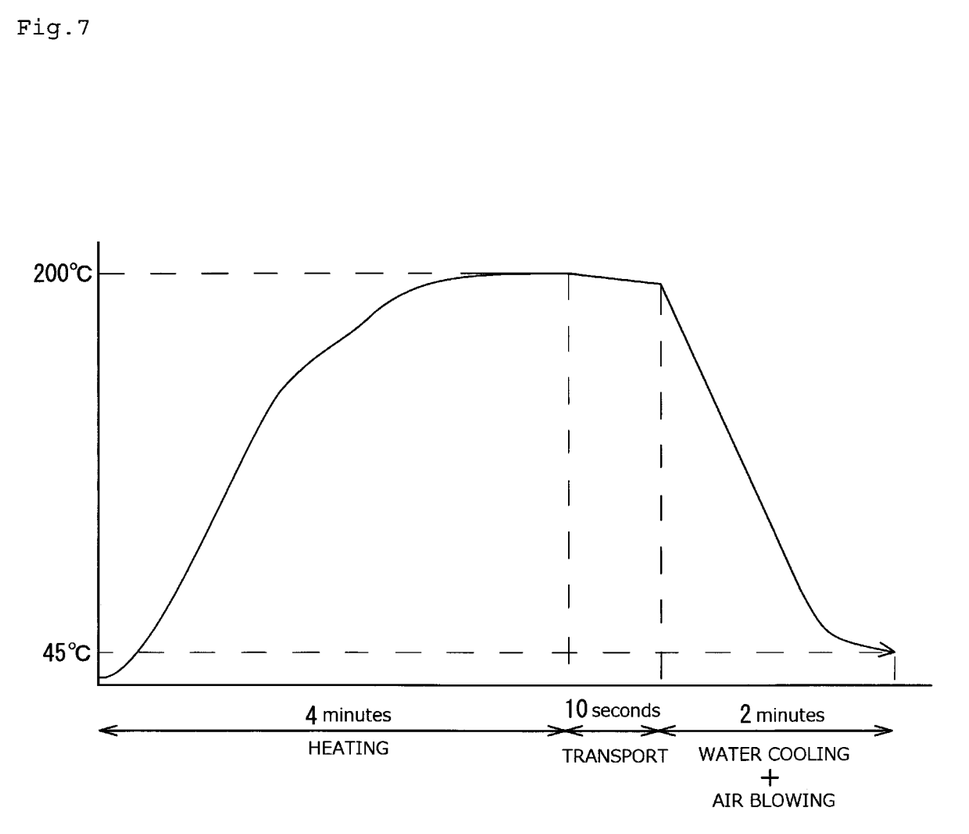
FIG. 7 shows a diagram showing baking conditions.
Figure 8:
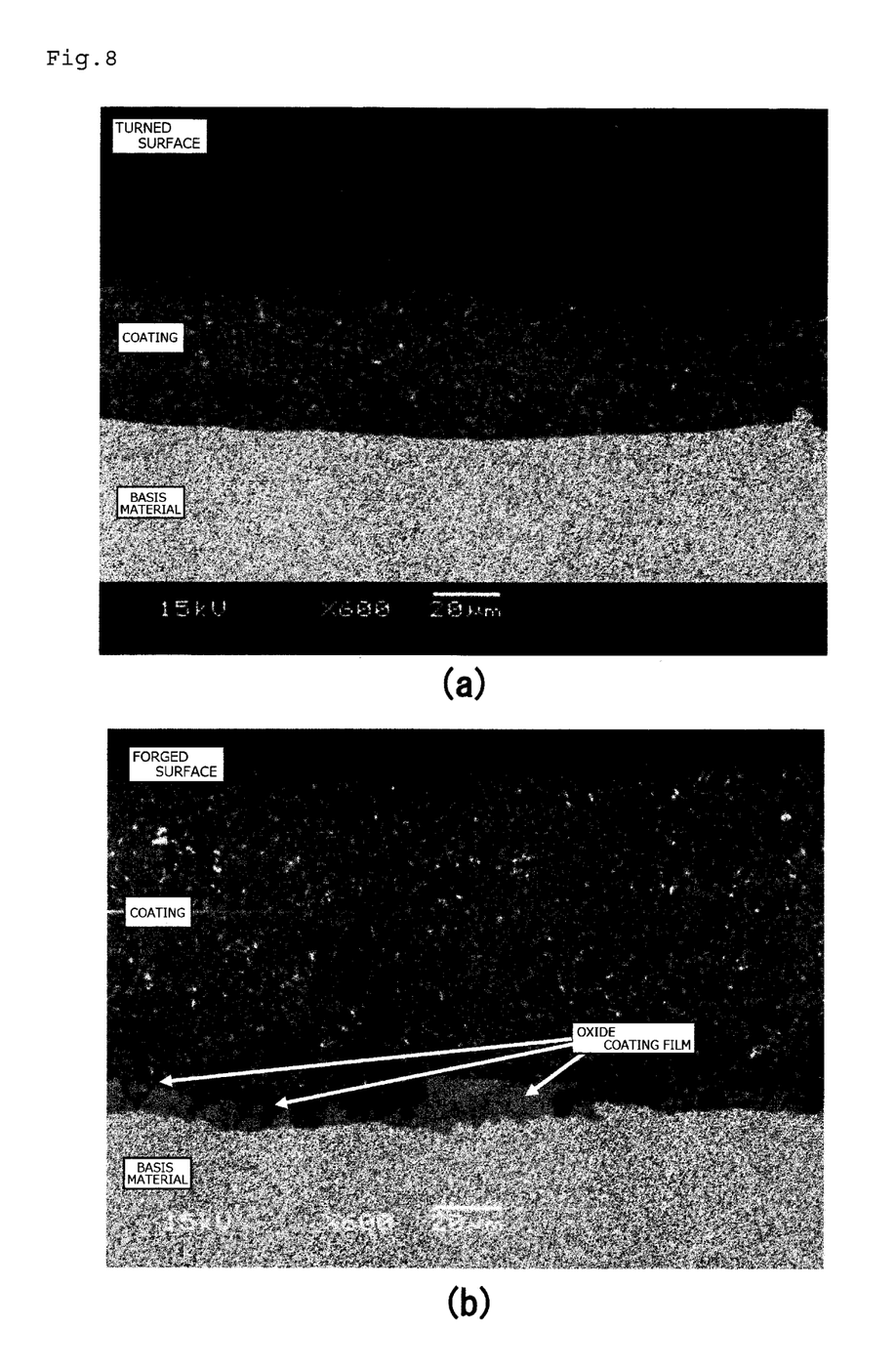
FIG. 8 shows a photograph of a cross-section of a coating film.

After powder coating, the high-frequency induction heating device shown in FIG. 2(a) and FIG. 3(a) was used, and annealing of the outer joint member and bake-hardening of the powder were carried out simultaneously. A coating film was formed on the surface of the outer joint member. The baking conditions are shown in FIG. 7, and a cross-sectional photograph of the coating film is shown in FIG. 8. FIG. 8(a) is a sectional view of the coating film that was formed on a turned face, and FIG. 8(b) is a sectional view of the coating film that was formed on a forged face. An oxide coating film was confirmed at the boundary between the basis material and the coating film in the cross-section of the coating film that was formed on the forged face.

The characteristics of the coating film of the outer joint member obtained by the method described above, i.e., coating film hardness, corrosion resistance determined by a salt water spray testing, and water resistance and oil resistance determined by immersion methods were evaluated by the evaluation methods described below. Water resistance was also measured for the examples in which a chemical conversion treatment was carried out as a pretreatment and in which alkali cleaning was similarly carried out. The results are shown in Table 1.

(1) Coating Film Hardness

The pencil hardness was measured according to "Scratch Hardness (Pencil Hardness Method)" as described in JIS K 5600 paragraph 5.4.

(2) Corrosion Resistance (Salt Water Spray Test)

The outer joint member on which the coating film had been formed was evaluated by a salt water spray testing as described in JIS Z 2371. The salt water spray conditions involved continuous spraying of the coating film face for 120 hr with a 5-mass % NaCl aqueous solution having a pH of 6.5 to 7.2 during the salt water spray test maintaining 35° C. The presence of rust was then evaluated visually.

(3) Water Resistance

The outer joint member on which the coating film had been formed was then immersed for 48 hr in 40° C. purified water, then dried. The adhesive performance was then measured as described in JIS K 5600 paragraph 5.6.

(4) Oil Resistance

After the outer joint member on which a thin film had been formed for 96 hr was immersed in engine oil at room temperature, the liquid resistance was measured as described in JIS K 5600, paragraph 6.1.

Example 2

With the exception that the alkali detergent was changed to an all-purpose detergent (WA-2061®, Kaken Tech), a coating film was formed on the cup part surface of an outer joint member in the same manner as in Example 1. The coating film characteristics were measured in the same manner as in Example 1, and the results are presented in Table 1.

Comparative Example 1

With the exception that alkali cleaning was not carried out, and a cleaning method involving cleaning with 60° C. purified water was utilized, a coating film was formed on the cup part surface of an outer joint member in the same manner as in Example 1. The coating film characteristics were measured in the same manner as in Example 1, and the results are presented in Table 1.

Comparative Example 2

With the exception that alkali cleaning was not carried out, but a chemical conversion treatment was carried out with iron phosphate, a coating film was formed on the cup part surface of an outer joint member in the same manner as in Example 1. The coating film characteristics were measured in the same manner as in Example 1, and the results are presented in Table 1.

TABLE 1

|  | Coating film hardness | Corrosion resistance | Water resistance | Oil resistance |
|---|---|---|---|---|
| Example 1 | H | No rust | Good coating film | Good coating film |
| Example 2 | H | No rust | Good coating film | Good coating film |
| Comparative Example 1 | H | Coating film separation | Coating film separation | Good coating film |
| Comparative Example 2 | H | Coating film separation | Coating film separation | Good coating film |

INDUSTRIAL APPLICABILITY

The coating film of the present invention has superior corrosion resistance and therefore is suitable for use on metal automotive parts such as constant velocity universal joints.

EXPLANATION OF REFERENCE NUMERALS AND SYMBOLS

1 Outer joint member
2 Cup portion
3 Shaft portion
4 Inner circumferential face
5 Track groove
6 Coating film
7 Coil passage-type high-frequency induction heating device
7a Multistage-type high-frequency induction heating device
8 Transport pathway
8a Stand
9, 9a, 9b, 10 High-frequency induction coil
11 Intermediate shaft
12 Shaft end part
13 Shaft middle part
14 Cross-hatched part

The invention claimed is:

1. A method of forming a coating film on a surface of a metal automotive part, comprising:
 a powder-coating step in which a powder is deposited by powder-coating on the surface of the metal automotive part that has been quenched after forging, and
 a tempering and bake-hardening step in which tempering of the metal automotive part and bake-hardening of the deposited powder are performed simultaneously,
 wherein the surface of the metal automotive part before the powder is deposited thereon is a work-hardened basis material surface,
 wherein in the powder-coating step, the powder is deposited on a surface which is a material surface that has not been subjected to a chemical conversion film treatment and has been cleaned using an alkaline detergent at a temperature of 50 to 80° C.,
 wherein the alkaline detergent is composed of an alkaline aqueous solution, that can remove non-reactive soap layers or reactive soap layers remaining on the surface of the metal automotive part that has been quenched after forging, contains a surfactant and
 wherein adhesion of the coating film to the material surface is increased by alkali treatment alone without formation of the chemical conversion film.

2. The method of forming a coating film according to claim 1, characterized in that the material surface is a surface layer that has been quenched after forging, and a turned face in which a part of the surface layer has been turned.

3. The method of forming a coating film according to claim 1, characterized in that the forging is cold forging, the surface hardness after cold forging is HRB 90 to 110, and the surface hardness after quenching is HRC 50 to 65.

4. The method of forming a coating film according to claim 1, characterized in that the quenching is high-frequency quenching, and tempering and powder bake-hardening are carried out by high-frequency induction heating.

5. The method of forming a coating film according to claim 1, characterized in that the powder is a pulverulent epoxy-based powder coating composition.

6. The method of forming a coating film according to claim 5, characterized in that the powder is a pulverulent coating composition comprising a bisphenol A epoxy resin, a hydrazide compound, and an inorganic filler.

7. The method of forming a coating film according to claim 6, characterized in that the hydrazide compound is an organic acid polyhydrazide.

8. The method of forming a coating film according to claim 6, characterized in that the inorganic filler is barium sulfate.

9. The method of forming a coating film according to claim 1, wherein the metal automotive part is an outer joint member constituting a constant velocity universal joint, or an intermediate shaft constituting a drive shaft.

10. The method of forming a coating film according to claim 9, characterized in that the coating film on the outer joint member or the intermediate shaft has a thickness of 40 to 150 μm, a pencil hardness of H to 2H, and a corrosion resistance of 120 hr or greater as determined by a salt water spray test.

* * * * *